US008756615B2

(12) United States Patent
Chin et al.

(10) Patent No.: US 8,756,615 B2
(45) Date of Patent: Jun. 17, 2014

(54) METHOD AND ELECTRONIC DEVICE FOR SYNCHRONIZING INFORMATION OF DUAL OPERATING SYSTEMS AND RECORDING MEDIUM

(75) Inventors: Cheng-Hao Chin, Taoyuan County (TW); Chien-Liang Lin, Taoyuan County (TW); Shin-Yun Lin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 168 days.

(21) Appl. No.: 13/440,990

(22) Filed: Apr. 5, 2012

(65) Prior Publication Data

US 2012/0204022 A1     Aug. 9, 2012

Related U.S. Application Data

(62) Division of application No. 12/183,066, filed on Jul. 31, 2008, now Pat. No. 8,312,476.

(60) Provisional application No. 60/969,962, filed on Sep. 5, 2007.

(30) Foreign Application Priority Data

Dec. 28, 2007   (TW) ............................. 96151029 A

(51) Int. Cl.
*G06F 9/54*     (2006.01)
(52) U.S. Cl.
CPC ........................ *G06F 9/54* (2013.01)
USPC ............................................. 719/319
(58) Field of Classification Search
None
See application file for complete search history.

(56) References Cited

U.S. PATENT DOCUMENTS

| | | | |
|---|---|---|---|
| 6,381,524 B1 * | 4/2002 | Kuragaki et al. | 701/36 |
| 6,505,107 B2 * | 1/2003 | Kuragaki et al. | 701/36 |
| 6,615,303 B1 * | 9/2003 | Endo et al. | 710/260 |
| 7,072,749 B2 * | 7/2006 | Kuragaki et al. | 701/36 |
| 7,127,723 B2 * | 10/2006 | Endo et al. | 719/319 |
| 2004/0223007 A1 | 11/2004 | Mamata | |
| 2005/0017994 A1 | 1/2005 | Oh | |
| 2007/0268200 A1 | 11/2007 | Fuller et al. | |

OTHER PUBLICATIONS

"Office Action of Taiwan Counterpart Application", issued on Jun. 20, 2012, p. 1-p. 6, in which the listed references were cited.

* cited by examiner

*Primary Examiner* — Qing Wu
(74) *Attorney, Agent, or Firm* — Jianq Chyun IP Office

(57) ABSTRACT

A method and an electronic device for synchronizing information of dual operating systems and a recording medium are provided. The method is used for synchronizing information of a first operating system and a second operating system when an electronic device is switching from a first operating system to a second operating system. First, the second operating system sends an information requesting message to a controller of the electronic device when the first operating system is switched to the second operating system. The controller checks if the first operating system operates in a work mode. If the first operating system operates in the work mode, the controller forwards the information requesting message to the first operating system, so as to obtain the information of the first operating system. Finally, the second system synchronizes the information recorded therein according to the obtained information.

20 Claims, 7 Drawing Sheets

METHOD AND ELECTRONIC DEVICE FOR SYNCHRONIZING INFORMATION OF DUAL OPERATING SYSTEMS AND RECORDING MEDIUM

CROSS-REFERENCE TO RELATED APPLICATION

This application is a divisional of an U.S. application Ser. No. 12/183,066, now patented with U.S. Pat. No. 8,312,476, filed on Jul. 31, 2008, which claims the priority benefits of U.S. provisional application Ser. No. 60/969,962, filed on Sep. 5, 2007 and Taiwan application serial no. 96151029, filed on Dec. 28, 2007. The entirety of each of the above-mentioned patent applications is hereby incorporated by reference herein and made a part of specification.

BACKGROUND OF THE INVENTION

1. Field of the Invention

The present invention generally relates to a method for synchronizing information, and in particular, to a method for synchronizing information of dual operating systems.

2. Description of Related Art

To keep up with the bustling pace of modern human life, various portable and space-saving electronic devices have been put forward one after another. For example, smart phones are not only equipped all functions of a conventional communication device, but also allow users to achieve purposes such as document writing, E-mail receiving/sending, network accessing, or the use of real-time communication software through a built-in Windows mobile operating system (Windows mobile OS) such as Windows Mobile. That is to say, such hand-held communication devices may not only be used to make phone calls, but also serves as a miniature PC with versatile functions. Further, with the progress of wireless network technology, those functions can be used free from time and space limitations. Therefore, such devices have become an indispensable tool in a modern life in pursuit of efficiency.

The architecture of such hand-held communication devices has an embedded system, and works through a Windows mobile OS. However, the function of the Windows mobile OS may be limited by the performance of the processor used in the hand-held communication device, and cannot achieve the multiplexed and diversified functions of an ordinary computer operating system. For example, a Windows OS such as Windows XP or Windows VISTA used in a PC is capable of processing complicated tasks like text edition and image processing, thus having a higher performance as compared with the Windows mobile OS. In order to improve the performance of the portable electronic devices, a brand new architecture integrating the portability of the Windows mobile OS and functionality of the Windows OS of a PC is developed.

In practical operation, the two operating systems of the dual-operating system architecture use the shared system resources alternately, i.e. only one operating system can use the screen or the speaker of the device at a time. Thus, when the user intends to stop and switch the current operating system to the other operating system, the system is switched to the desired operating system by pressing a switch key disposed on the device, and meanwhile, the frame of the operating system displayed on the screen is switched as well.

However, the method of directly switching from one operating system to the other has a problem that the setting information cannot be altered in two operating systems concurrently. Thus, when switching the operating system, problems that the backlight of the screen is too bright or too dim or the volume is too large or too small may be caused due to different settings. Therefore, the dual operating systems usually need a suitable mechanism to synchronizing the information thereof, so as to solve the problem of information asynchronization.

SUMMARY OF THE INVENTION

Accordingly, the present invention is directed to a method for synchronizing information of dual operating systems, in which an independent embedded controller (EC) is used to acquire the information set by the operating system before switching when the operating systems is switched, so as to adjust the corresponding information of the current operating system, thereby synchronizing the information of the dual operating systems.

The present invention is also directed to a method for synchronizing information of dual operating systems, in which the information of the other operating system is synchronized when the information of the current operating system is adjusted, thereby synchronizing the information of the dual operating systems.

As embodied and broadly described herein, the present invention provides a method for synchronizing information of dual operating systems, for synchronizing information of a first operating system and a second operating system when an electronic device is switched from the first operating system to the second operating system. The method includes the following steps. First, a controller of the electronic device switches the first operating system to the second operating system. The second operating system sends an information requesting message to the controller of the electronic device. The controller checks if the first operating system operates in a work mode. If the first operating system operates in the work mode, the controller forwards the information requesting message to the first operating system, so as to obtain the information of the first operating system. Finally, the second operating system synchronizes the information recorded therein according to the obtained information.

In an embodiment of the present invention, the controller switches the first operating system to the second operating system when receiving an operating system switching signal. The operating system switching signal is generated when a switch key is triggered, and the switch key is a physical key disposed on the electronic device or a virtual key displayed on a screen of the electronic device.

In an embodiment of the present invention, after the controller checks if the first operating system operates in the work mode, if the first operating system does not operate in the work mode, the controller forces the first operating system to restore the work mode, and then forwards the information requesting message to the first operating system, so as to obtain the information of the first operating system.

In an embodiment of the present invention, after the controller checks if the first operating system operates in the work mode, if the first operating system does not operate in the work mode, the controller takes no action for a moment.

In an embodiment of the present invention, after the controller checks if the first operating system operates in the work mode, if the first operating system does not operate in the work mode, the controller reads a memory built therein, so as to obtain the information of the first operating system.

In an embodiment of the present invention, the information recorded in the memory of the controller is stored in a regular time interval by the first operating system when the first operating system operates in the work mode or before the first operating system leaves the work mode.

In an embodiment of the present invention, the information includes time information, brightness information, or volume information.

The present invention further provides another method for synchronizing information of dual operating systems. The method is for synchronizing the same information in a second operating system when an information in a first operating system of an electronic device is adjusted, including the following steps. First, the first operating system receives an information adjusting signal, adjusts the information recorded therein accordingly, and sends an information adjusting message to a controller of the electronic device. At this time, the controller checks if the second operating system operates in a work mode. If the second operating system operates in the work mode, the controller forwards the information adjusting message to the second operating system, so as to provide the information to the second operating system. Finally, the second operating system synchronizes the information recorded therein according to the information in the information adjusting message.

In an embodiment of the present invention, the information adjusting signal is generated when an information adjusting key of the electronic device is triggered, and the information adjusting key is a physical key disposed on the electronic device or a virtual key displayed on a screen of the electronic device.

In an embodiment of the present invention, after receiving the information adjusting message, the controller further executes a corresponding adjusting action according to the information adjusting message. The adjusting action includes a screen brightness adjustment or a volume adjustment.

In an embodiment of the present invention, after the controller checks if the second operating system operates in the work mode, if the second operating system does not operate in the work mode, the controller forces the second operating system to restore the work mode, and then forwards the information adjusting message to the second operating system, so as to synchronize the information of the second operating system.

In an embodiment of the present invention, after the first operating system sends the information adjusting message to the controller of the electronic device, the controller further stores the information in a memory built therein. The information includes time information, brightness information, or volume information.

In an embodiment of the present invention, after the controller checks if the second operating system operates in the work mode, if the second operating system does not operate in the work mode, the controller takes no action for a moment, and waits for the second operating system to restore the work mode. When the second operating system restores the work mode, the second operating system sends an information requesting signal to the controller, so as to read the information recorded in the memory, and synchronizes the information recorded therein according to the obtained information.

In an embodiment of the present invention, the controller includes an embedded controller (EC), and the electronic device includes a notebook computer, an Ultra Mobile Personal Computer (UMPC), or a personal digital assistant (PDA).

The present invention adopts an independent embedded controller to acquire the information set by the operating system before the switching when the operating system is switched, so as to adjust the corresponding information of the current operating system. In addition, when the information of the current operating system is adjusted, the corresponding information of the other operating system is adjusted simultaneously, thereby synchronizing the information of the dual operating systems.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
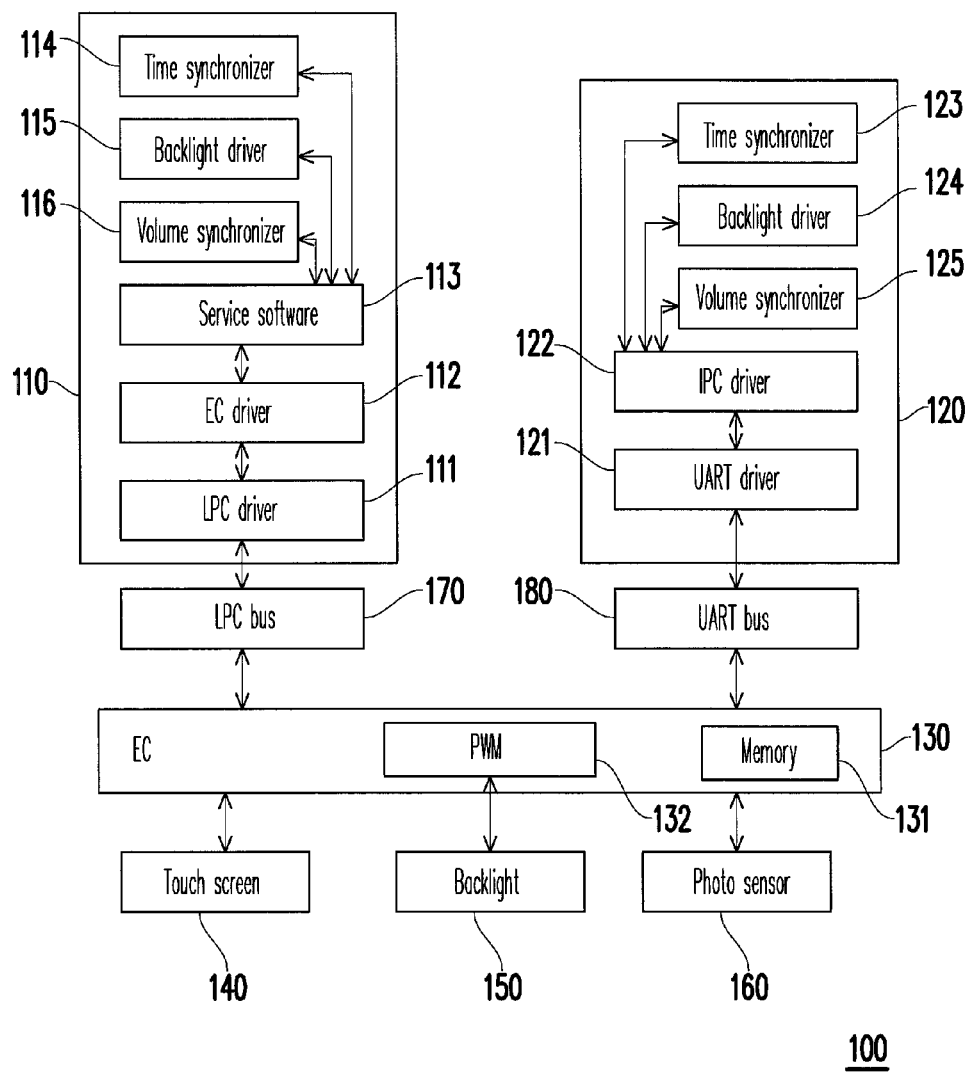
FIG. 1 is a block diagram of a dual-operating system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

When using a dual-operating system device, since an operation frame of only one operating system may be displayed on a screen of the device at a time, during operation, a user must switch between the two operating systems, thus leading to information asynchronization of the operating systems. Accordingly, the present invention adopts an independent embedded controller (EC) to execute the information synchronization, for synchronizing the information of the two operating systems through message transmission when the operating system is switched, or synchronizing the information of the other operating system instantly when the information of one operating system is altered, thereby solving the problem of information asynchronization in the prior art. In order to make the present invention more comprehensible, embodiments are described below as the examples to prove that the invention can actually be realized.

FIG. 1 is a block diagram of a dual-operating system according to an embodiment of the present invention. Referring to FIG. 1, a dual-operating system 100 of this embodiment mainly includes a Windows operating system (Windows OS) 110 (e.g., Windows XP or Windows VISTA), a windows mobile operating system 120 (e.g., Windows Mobile or Windows CE), and an embedded controller (EC) 130. The electronic device using the dual-operating system 100 is, for example, but not limited to, a notebook computer, an Ultra Mobile Personal Computer (UMPC), or a personal digital assistant (PDA).

The EC 130, having a memory 131 and a pulse width modulation (PWM) module 132, is connected to peripheral hardware devices such as, for example, a contact screen 140, a backlight module 150, and an optical sensor 160 of the electronic device using the dual-operating system 100. In addition, other peripheral hardware devices may include a keyboard, battery cell, webcam, display, speaker (not shown), and so on, which are shared by the two operating systems.

Further, the EC 130 is also connected to a low pin count (LPC) bus 170 driven by an LPC driver 111 of the Windows OS 110, and is driven by an EC driver 112, so as to communicate with the Windows OS 110 through an LPC interface. In detail, through a service software 113 of the Windows OS 110, the EC 130 is communicated with a time synchronizer 114, a backlight module driver 115, and a volume synchronizer 116 of the Windows OS 110, for controlling the operation of peripheral hardware devices such as the backlight module 150 and the speaker (not shown) of the electronic device.

Similarly, the EC 130 is also connected to a universal asynchronous receiver transmitter (UART) bus 180 driven by a UART driver 121 of the Windows mobile OS 120, so as to communicate with the Windows mobile OS 120 through a UART interface. In detail, through an interprocess communication (IPC) driver 122 of the Windows mobile OS 120, the EC 130 is communicated with a time synchronizer 123, a backlight module driver 124, and a volume synchronizer 125 of the Windows mobile OS 120, for controlling the operation of peripheral hardware devices such as the backlight module 150 and the speaker (not shown) of the electronic device. It should be noted that the adopted LPC interface and UART interface are described here as an embodiment, instead of limiting the scope of the present invention.

The present invention provides a universal message format to enable the communication between the Windows OS 110, Windows mobile OS 120, and EC 130. By transmitting this message, the above three units may order other units to carry out specific tasks or transmit data to other units.

Figure 2:
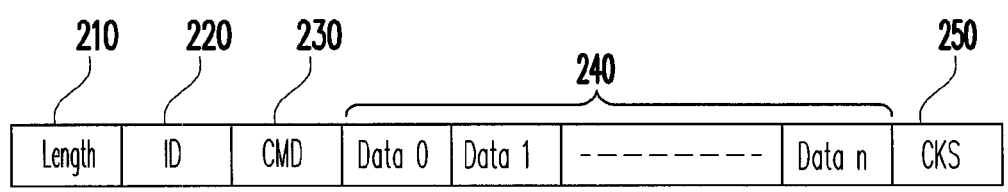
FIG. 2 is a schematic view of a message format according to an embodiment of the present invention.

FIG. 2 is a schematic view diagram of a message format according to an embodiment of the present invention. Referring to FIG. 2, the head of the message 200 is a length area 210 indicating an effective length of the message 200. An identification (ID) area 220 indicating an initial start point and a destinationan end point of the message 200 follows the head. Then, a command (CMD) area 230 includes an instruction for commanding a destination end point unit. Subsequently, a data area 240 including a plurality of data Data 0 to Data n provides data required by the destination end point unit for executing a CMD. A checksum (CKS) area 250 is added at last for assisting the destination end point unit to ensure the completeness of the content of the message.

Through the transmission of the message in the above embodiment, a communication channel between among the Windows OS 110, Windows mobile OS 120, and EC 130 is built. As such, the method for synchronizing information of dual operating systems of the present invention is implemented. The detailed steps of the method are described as follows.

The First Embodiment

Figure 3:
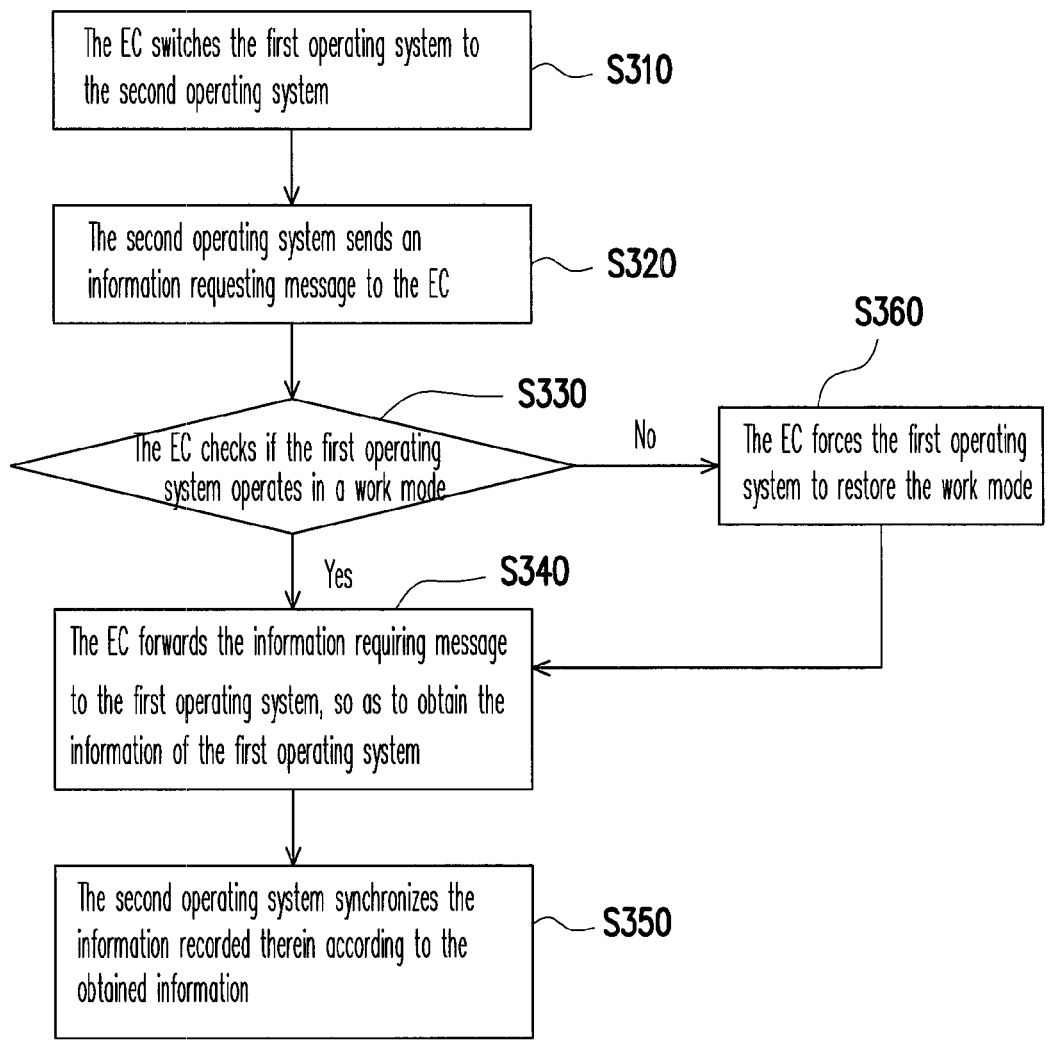
FIG. 3 is a flow chart of a method for synchronizing information of dual operating systems according to a first embodiment of the present invention.

FIG. 3 is a flow chart of a method for synchronizing information of dual operating systems according to a first embodiment of the present invention. Referring to FIG. 3, this embodiment is applicable to an electronic device (e.g., the dual-operating system device 100 in the above embodiment), and is used for synchronizing information of a first operating system and a second operating system when an electronic device is switched from the first operating system to the second operating system. The first operating system and the second operating system are, for example, a combination of the Windows OS and the Windows mobile OS, and the synchronized information is, for example, a system information such as time information, brightness information, or volume information. The method for synchronizing information of the present invention includes the following steps.

First, the currently used operating system is switched from the first operating system to the second operating system (step S310). The switching of the operating system is executed by, for example, the EC, and after receiving an operating system switching signal, the EC controls the electronic device to switch from the first operating system to second operating system. An operating system switching signal is generated, for example, when a switch key of the electronic device is triggered, and the switch key is, for example, but not limited to, a physical key disposed on the electronic device or a virtual key displayed on a screen of the electronic device.

After the operating system is switched, the second operating system sends an information requesting message to the EC (step S320). The information requesting message adopts, for example, the format as shown in FIG. 2, for requiring the EC to execute a corresponding action.

After receiving the information requesting message, the EC first checks if the first operating system operates in a work mode (step S330). In detail, before the electronic device switches to the second operating system, the first operating system may enter a sleep, a hibernate, or even a power off mode, and thus the EC must confirm that the first operating system operates in the work mode, so as to obtain the correct information.

In the step S330, if the EC determines that the first operating system operates in the work mode, the EC forwards the information requesting message to the first operating system, so as to obtain the desired information from the first operating system (step S340). In detail, the information requesting message includes a command requiring the first operating system to send back the information. After receiving the information requesting message, the first operating system sends back the requested information through the message transmission as well.

Otherwise, in step S330, if the EC determines that the first operating system does not operate in the work mode, the EC forces the first operating system to restore the work mode (step S360), and then forwards the information requesting message to the first operating system, so as to obtain the desired information from the first operating system (step S340).

After obtaining the information of the first operating system, the second operating system synchronizes the corresponding information recorded therein according to the obtained information (step S350), thereby synchronizing the information of the two operating systems. Therefore, the electronic device achieves the purpose of synchronizing the information of the dual operating systems.

In the method for synchronizing information, when entering the sleep, hibernate, or power off mode, the first operating system is awakened by the EC, so as to perform the information synchronization. However, in another embodiment, the EC may also take no action for a moment, and waits for the first operating system to restore the work mode before continuing to execute the information synchronization. Another embodiment is illustrated in detail as follows.

The Second Embodiment

Figure 4:
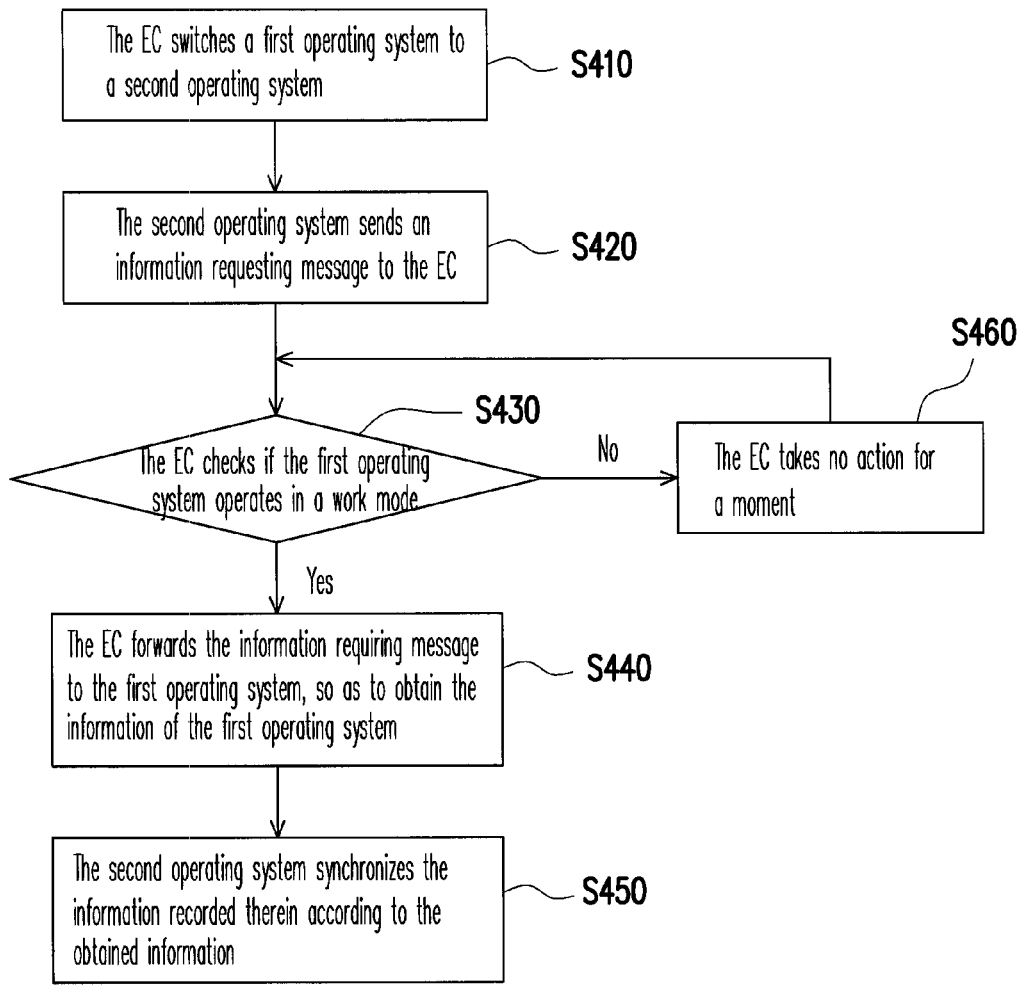
FIG. 4 is a flow chart of a method for synchronizing information of dual operating systems according to a second embodiment of the present invention.

FIG. 4 is a flow chart of a method for synchronizing information of dual operating systems according to a second embodiment of the present invention. Referring to FIG. 4, this embodiment is applicable to an electronic device (e.g., the dual-operating system device 100 in the above embodiment), and is used for synchronizing information of a first operating system and a second operating system when an electronic device is switching from the first operating system to the second operating system. The first operating system and the second operating system are, for example, a combination of the Windows OS and the Windows mobile OS, and the synchronized information is system information such as brightness information or volume information.

First, the currently used operating system is switched from the first operating system to the second operating system (step S410). The second operating system sends an information requesting message to an EC of the electronic device (step S420). After receiving the information requesting message, the EC first checks if the first operating system operates in a work mode (step S430). If the EC determines that the first operating system operates in the work mode, the EC forwards the information requesting message to the first operating system, so as to obtain desired information from the first operating system (step S440). The second operating system synchronizes the corresponding information recorded therein according to the obtained information (step S450), thereby synchronizing the information of the two operating systems. The above steps are the same as or similar to the steps S310 to S350 of the above embodiment, therefore the details of the content will not be described herein again.

It should be emphasized that in the step S430 of this embodiment, if the EC determines that the first operating system does not operate in the work mode, the EC takes no action for a moment (step S460), and returns to the step S430 to wait for the first operating system to restore the work mode. When the first operating system restores the work mode, the step S440 and the information synchronization of step S450 are performed, thereby synchronizing the information of the two operating systems.

Further, in still another embodiment, when the EC determines that the first operating system does not operate in the work mode, the EC can read the information in a memory 131 of the EC previously stored by the first operating system. The second operating system then performs the information synchronization. Another embodiment is illustrated in detail as follows.

The Third Embodiment

Figure 5:
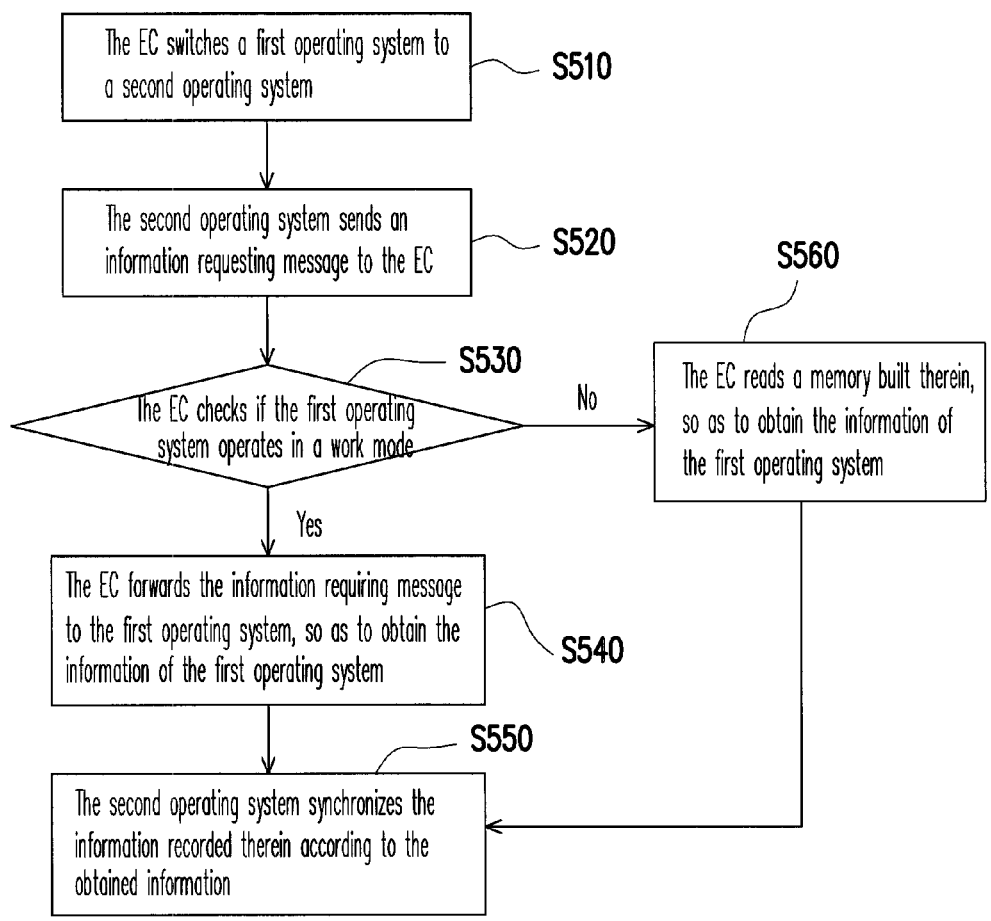
FIG. 5 is a flow chart of a method for synchronizing information of dual operating systems according to a third embodiment of the present invention.

FIG. 5 is a flow chart of a method for synchronizing information of dual operating systems according to a third embodiment of the present invention. Referring to FIG. 5, this embodiment is applicable to an electronic device (e.g., the dual-operating system device 100 of the above embodiment), and is used for synchronizing information of a first operating system and a second operating system when an electronic device is switched from the first operating system to the second operating system. The first operating system and the second operating system are, for example, a combination of the Windows OS and the Windows mobile OS, and the synchronized information is system information such as brightness information or volume information. The method for synchronizing information of the present invention includes the following steps.

First, the currently used operating system is switched from the first operating system to the second operating system (step S510). The second operating system sends an information requesting message to an EC of the electronic device (step S520). After receiving the information requesting message, the EC first checks if the first operating system operates in a work mode (step S530). If the EC determines that the first operating system operates in the work mode, the EC forwards the information requesting message to the first operating system, so as to obtain the desired information from the first operating system (step S540). The second operating system synchronizes the corresponding information recorded therein according to the obtained information (step S550), thereby synchronizing the information of the two operating systems. The above steps are the same as or similar to the steps S310 to S350 of the above embodiment, therefore the details of the content will not be described herein again.

It should be emphasized that in the step S530 of this embodiment, if the EC determines that the first operating system does not operate in the work mode, the EC reads a memory built therein, so as to obtain the information of the first operating system (step S560). The second operating system synchronizes the corresponding information recorded therein according to the obtained information (step S550), thereby synchronizing the information of the two operating systems. The information recorded in the memory of the EC is, for example, but not limited to, stored every specific time by the first operating system when the first operating system operates in the work mode or before the first operating system leaves the work mode. Accordingly, the information obtained from the EC by the second operating system is the result of a latest adjustment of the first operating system, thereby achieving the purpose of information synchronization.

It should be noted that the information in the memory is fixed, therefore the method of this embodiment is more suitable to the synchronization of the fixed information such as the brightness information and the volume information. If it intends to perform the synchronization of the time information, it is suitable to obtain the time information from the previous operating system, and the method for obtaining the time information is basically the same as in the first embodiment, which will not be described herein again.

In addition to the method for synchronizing information when the operating system is switched, the present invention further provides another method for synchronizing information, in which the corresponding information in the other operating system is adjusted simultaneously when the information of the currently used operating system is altered, thereby achieving the information synchronization of the two operating systems at an early moment. Another embodiment is illustrated in detail as follows.

The Fourth Embodiment

Figure 6:
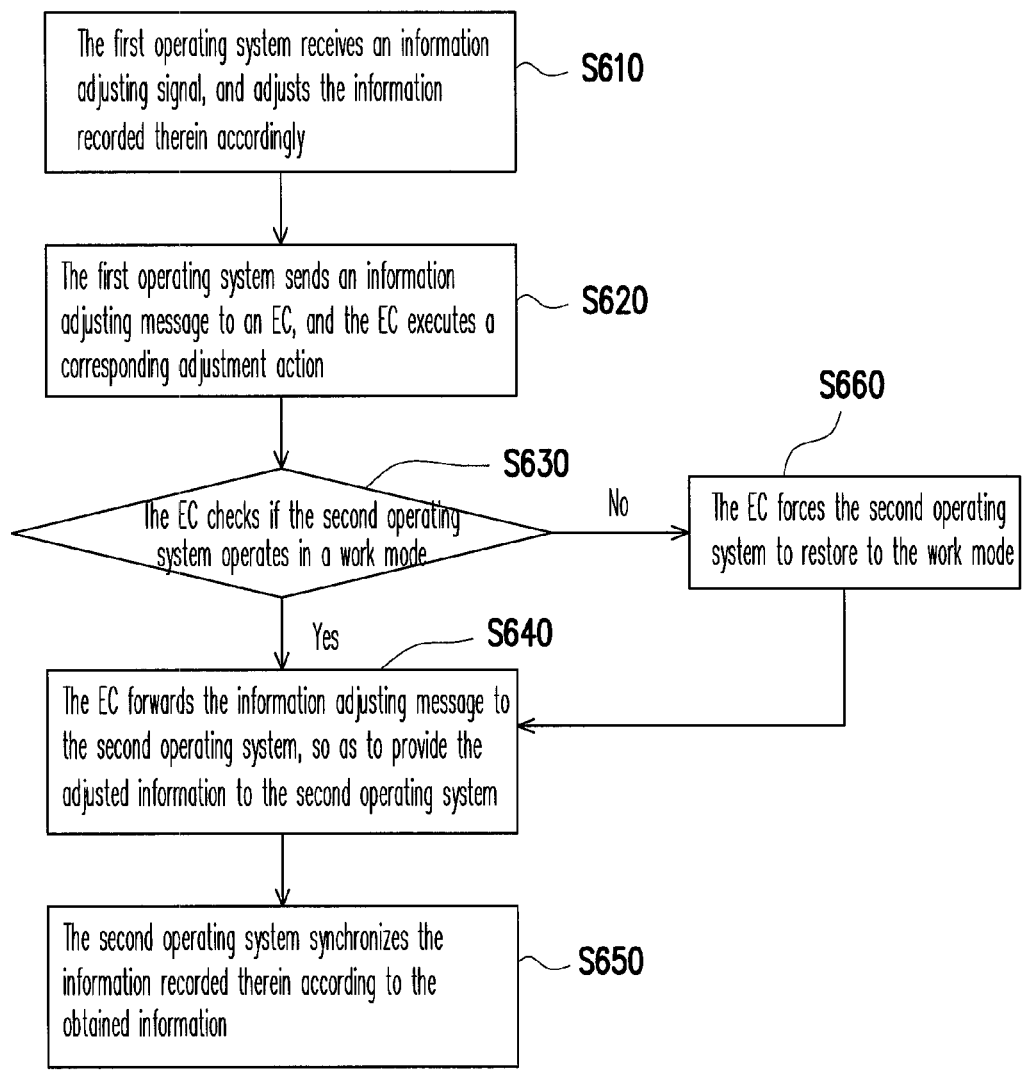
FIG. 6 is a flow chart of a method for synchronizing information of dual operating systems according to a fourth embodiment of the present invention.

FIG. 6 is a flow chart of a method for synchronizing information of dual operating systems according to a fourth embodiment of the present invention. Referring to FIG. 6, this embodiment is applicable to synchronizing corresponding information of a second operating system when the information of a first operating system of an electronic device (e.g., the dual-operating system device 100 of the above embodiment) is adjusted. The first operating system and the second operating system are, for example, a combination of the Windows OS and the Windows mobile OS, and the synchronized information is system information such as time information, brightness information, or volume information. The method for synchronizing information of the present invention includes the following steps.

First, the first operating system receives an information adjusting signal, and adjusts the information recorded therein accordingly (step S610). The information adjusting signal is generated, for example, by pressing an adjusting key on the electronic device, and the adjusting key may be, but not limited to, a physical key disposed on the electronic device or a virtual key displayed on a screen of the electronic device.

The first operating system sends an information adjusting message to an EC of the electronic device, and the EC executes a corresponding adjusting action (step S620), in which the adjusting action is, for example, a brightness adjustment or a volume adjustment. For example, if the user intends to adjust the screen brightness when operating the first operating system, the user can perform the brightness adjustment by selecting a brightness adjusting key in the screen. After receiving an adjusting signal generated when the adjusting key is triggered, the first operating system sends a brightness adjusting message to the EC according to the brightness value adjusted by the user. At this time, the EC executes the adjustment of the screen brightness through a pulse width modulation (PWM) module 132.

The EC checks if the second operating system operates in the work mode (step S630). In detail, when using the first operating system, the second operating system may be in a sleep, a hibernate, or even a power off mode, so the EC must determine whether the second operating system operates in the work mode before executing the information synchronization.

In the step S630, if the EC determines that the second operating system operates in the work mode, the EC forwards the information adjusting message to the second operating system, so as to provide the adjusted information to the second operating system (step S640). The second operating system synchronizes the information recorded therein according to the information adjusting message (step S650). In detail, in addition to a command requiring the second operating system to execute the synchronization, the information adjusting message also includes a content of the information to be adjusted, such as the brightness value or volume value to be adjusted. Therefore, the second operating system may synchronize the original set values according to the information included in the information adjusting message, thereby achieving the purpose of information synchronization.

Otherwise, in the step S630, if the EC determines that the second operating system does not operate in the work mode, the EC forces the second operating system to restore the work mode (step S660). Similarly, the EC sends the information adjusting message to the second operating system, so as to provide the adjusted information to the second operating system (step S640). The second operating system may synchronize the information recorded therein according to the information adjusting message (step S650).

It should be noted that in the above method for synchronizing information, the information synchronization is executed by awaking the second operating system. However, in another method, the EC takes no action for a moment, and waits for the second operating system to restore the work mode. The second operating system automatically executes the information synchronization, which will be described in detail in another embodiment as follows.

The Fifth Embodiment

Figure 7:
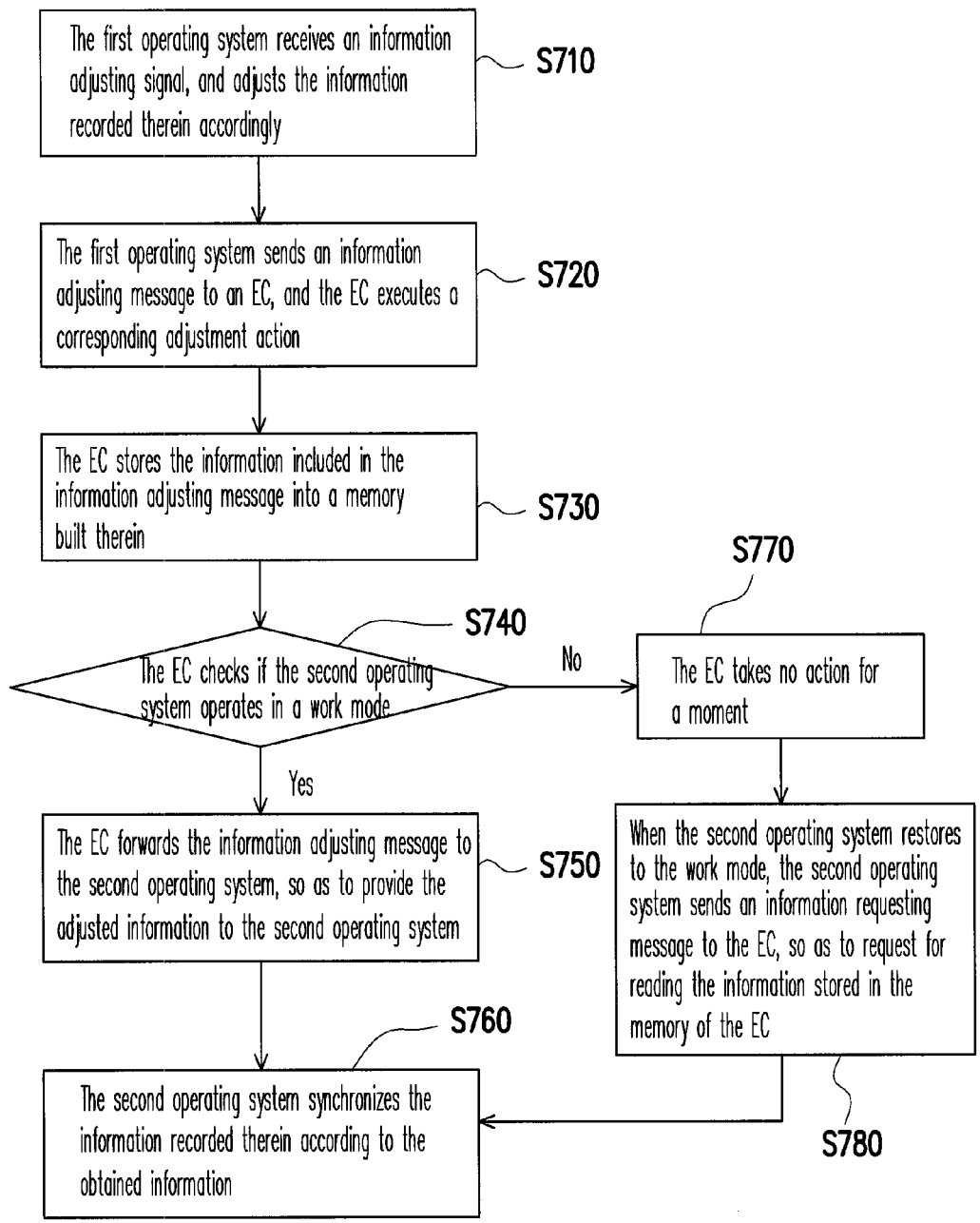
FIG. 7 is a flow chart of a method for synchronizing information of dual operating systems according to a fifth embodiment of the present invention.

FIG. 7 is a flow chart of a method for synchronizing information of dual operating systems according to a fifth embodiment of the present invention. Referring to FIG. 7, this embodiment is applicable to synchronizing corresponding information of a second operating system when the information of a first operating system of an electronic device (e.g., the dual-operating system device 100 of the above embodiment) is adjusted. The first operating system and the second operating system are, for example, a combination of the Windows OS and the Windows mobile OS, and the synchronized information is system information such as time information, brightness information, or volume information. The method for synchronizing information of the present invention includes the following steps.

First, the first operating system receives an information adjusting signal, and adjusts the information recorded therein accordingly (step S710). The first operating system sends the information adjusting message to an EC of the electronic device, and the EC executes a corresponding adjusting action (step S720). The above steps are the same as or similar to the steps S610 to S650 of the above embodiment and the details of the content will not be described herein again.

It should be emphasized that in this embodiment, the EC further stores the information included in the information adjusting message in a memory built therein (step S730), so as to be provided to the second operating system for information synchronization when the second operating system requires.

Similarly, the EC checks if the second operating system operates in the work mode (step S740). In detail, when using the first operating system, the second operating system may be in a sleep, a hibernate, or even a power off mode, so the EC must make sure that the second operating system operates in the work mode before executing the information synchronization.

In the step S740, if the EC determines that the second operating system operates in the work mode, the EC forwards the information adjusting message to the second operating system, so as to provide the adjusted information to the second operating system (step S750). The second operating system synchronizes the information recorded therein according to the information adjusting message (step S760).

Otherwise, in the step S740, if the EC determines that the second operating system does not operate in the work mode, the EC takes no action for a moment (step S770), and waits for the second operating system to restore the work mode. The second operating system automatically executes the information synchronization. In detail, when the second operating system restores the work mode, the second operating system sends the information requesting message to the EC of the electronic device, so as to request for reading the synchronous information stored in the memory of the EC (step S780).

The second operating system synchronizes the information recorded therein according to the information obtained from reading (step S760), thereby achieving the information synchronization. In this embodiment, the user currently uses the first operating system, so the settings of the second operating system will not influence the current operation. Once the second operating system restores the work mode, the second operating system automatically executes the information synchronization, thereby solving the problem of information asynchronization when the operating system is switched.

In view of the above, the method for synchronizing information of dual operating systems in the present invention transmits the information required by the synchronization to the other operating system appropriately through the message transmission and the determination of the EC, thereby solving the problem of the information asynchronization when the operating system is switched in the prior art.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for synchronizing information of dual operating systems in an electronic device, for synchronizing a second information of a second operating system of the electronic device when a first information of a first operating system of the electronic device is adjusted, the method comprising:

the first operating system receiving an information adjusting signal, and adjusting the first information recorded therein accordingly;

the first operating system sending an information adjusting message to a controller of the electronic device;

the controller checking if the second operating system operates in a work mode;

if the second operating system operates in the work mode, the controller forwarding the information adjusting message to the second operating system, so as to provide the first information to the second operating system; and the second operating system synchronizing the second information recorded therein according to the first information in the information adjusting message.

2. The method according to claim 1, wherein the information adjusting signal is generated when an information adjusting key of the electronic device is triggered, and the information adjusting key is a physical key disposed on the electronic device or a virtual key displayed on a screen of the electronic device.

3. The method according to claim 1, wherein after receiving the information adjusting message, the controller further executes a corresponding adjusting action according to the information adjusting message.

4. The method according to claim 3, wherein the adjusting action comprises a screen brightness adjustment or a volume adjustment.

5. The method according to claim 1, after the controller checking if the second operating system operates in the work mode, further comprising:

if the second operating system does not operate in the work mode, the controller forcing the second operating system to restore the work mode, and the controller forwarding the information adjusting message to the second operating system.

6. The method according to claim 1, after the first operating system sending the information adjusting message to the controller of the electronic device, further comprising:

the controller storing the first information in a memory built therein.

7. The method according to claim 6, after the controller checking if the second operating system operates in the work mode, further comprising:

if the second operating system does not operate in the work mode, the controller taking no action for a moment, and waiting for the second operating system to restore the work mode; and when the second operating system restores the work mode, the second operating system sending an information requesting signal to the controller, so as to read the first information recorded in the memory.

8. The method according to claim 1, wherein the first information and the second information respectively comprises time information, brightness information, or volume information.

9. The method according to claim 1, wherein the controller comprises an embedded controller (EC).

10. The method according to claim 1, wherein the electronic device comprises a notebook computer, an Ultra Mobile PC (UMPC), or a personal digital assistant (PDA).

11. An electronic device, comprising:

a first operating system, receiving an information adjusting signal, adjusting a first information recorded therein accordingly, and sending an information adjusting message to a controller;

a second operating system; and the controller, checking if the second operating system operates in a work mode when receiving the information adjusting message, wherein if the second operating system operates in the work mode, the controller forwarding the information adjusting message to the second operating system and the second operating system synchronizing a second information recorded therein according to the first information in the information adjusting message.

12. The electronic device according to claim 11, wherein the first operating system generates the information adjusting signal when an information adjusting key of the electronic device is triggered, and wherein the information adjusting key is a physical key disposed on the electronic device or a virtual key displayed on a screen of the electronic device.

13. The electronic device according to claim 11, wherein the controller further executes a corresponding adjusting action according to the information adjusting message, and wherein the adjusting action comprises a screen brightness adjustment or a volume adjustment.

14. The electronic device according to claim 11, wherein if the second operating system does not operate in the work mode, the controller further forces the second operating system to restore the work mode and forwards the information adjusting message to the second operating system.

15. The electronic device according to claim 11, wherein the controller further stores the first information in a memory built therein.

16. The electronic device according to claim 15, wherein if the second operating system does not operate in the work mode, the controller takes no action for a moment, and waits for the second operating system to restore the work mode, and when the second operating system restores the work mode, the second operating system sends an information requesting signal to the controller, so as to read the first information recorded in the memory.

17. The electronic device according to claim 11, wherein the first information and the second infoiniation respectively comprises time information, brightness information, or volume information.

18. The electronic device according to claim 11, wherein the controller comprises an embedded controller (EC).

19. The electronic device according to claim 11, wherein the electronic device comprises a notebook computer, an Ultra Mobile PC (UMPC), or a personal digital assistant (PDA).

20. A non-transitory recording medium, recording program instructions for executing an method for synchronizing a second information of a second operating system of an electronic device when a first information of a first operating system of the electronic device is adjusted, the method comprising:

the first operating system receiving an information adjusting signal, and adjusting the first information recorded therein accordingly;

the first operating system sending an information adjusting message to a controller of the electronic device;

the controller checking if the second operating system operates in a work mode;

if the second operating system operates in the work mode, the controller forwarding the information adjusting message to the second operating system, so as to provide the first information to the second operating system; and the second operating system synchronizing the second information recorded therein according to the first information in the information adjusting message.

* * * * *